United States Patent
Saito et al.

(10) Patent No.: US 8,317,625 B2
(45) Date of Patent: Nov. 27, 2012

(54) GAME APPARATUS, GAME PROGRAM AND INFORMATION RECORDING MEDIUM

(75) Inventors: Chikara Saito, Tokyo (JP); Ryoma Araki, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 0 days.

(21) Appl. No.: 13/297,410

(22) Filed: Nov. 16, 2011

(65) Prior Publication Data

US 2012/0129612 A1 May 24, 2012

(30) Foreign Application Priority Data

Nov. 19, 2010 (JP) ................................ 2010-258491

(51) Int. Cl.
*A63F 13/00* (2006.01)
(52) U.S. Cl. ....................................................... 463/42
(58) Field of Classification Search .............. 463/40–43; 704/257; 709/224
See application file for complete search history.

(56) References Cited

U.S. PATENT DOCUMENTS

| | | | | |
|---|---|---|---|---|
| 6,144,938 | A * | 11/2000 | Surace et al. ................. | 704/257 |
| 8,108,509 | B2 * | 1/2012 | Chatani ......................... | 709/224 |
| 2003/0224856 | A1 * | 12/2003 | Bukovsky et al. .............. | 463/42 |
| 2006/0003843 | A1 * | 1/2006 | Kobayashi et al. ............. | 463/43 |
| 2006/0136584 | A1 * | 6/2006 | Decker et al. .................. | 709/224 |
| 2007/0167204 | A1 * | 7/2007 | Lyle et al. ........................ | 463/9 |
| 2008/0221892 | A1 * | 9/2008 | Nathan et al. .................. | 704/257 |
| 2011/0264796 | A1 * | 10/2011 | Ganetakos et al. ........... | 709/224 |

FOREIGN PATENT DOCUMENTS

| | | |
|---|---|---|
| JP | 2005-253687 A | 9/2005 |
| JP | 2009-72310 A | 4/2009 |

* cited by examiner

*Primary Examiner* — Masud Ahmed
(74) *Attorney, Agent, or Firm* — Greenblum & Bernstein, P.L.C.

(57) ABSTRACT

The present invention aims at providing a game such that even when player uses predetermined characters for a long time to proceed the game as in the case of the RPG, there is no possibility that player may become weary of motion patterns of characters used. The present invention is essentially based on the finding that there is employed a scheme to store motion information of characters every title data obtained when specific conditions of the game are attained to permit a player to set an arbitrary title data with respect to a character so that the player can change motion information of each character as occasion demands also in the progress of the game.

5 Claims, 4 Drawing Sheets

(a) Title database

| No | Title | Condition |
|---|---|---|
| 123 | Amateur fighter | Level of fighter has become equal to 10 |
| 124 | Herb intoxication | Fighter has eaten 30 herbs |
| 125 | Rescuer | Fighter has cleared 10 quests |
| 126 | Veteran | Fighter has wined 100 times |
| ... | ...... | ............. |

(b) Motion information Database

| Title No | Motion information |
|---|---|
| 123 | Parameter123 |
| 124 | Parameter124 |
| 125 | Parameter125 |
| 126 | Parameter126 |
| ... | ...... |

(c) Motion information Database

| Title No | Motion data |
|---|---|
| 123 | Data123 |
| 124 | Data124 |
| 125 | Data125 |
| 126 | Data126 |
| ... | ...... |

(d) Motion parameter

| Parameter123 | | |
|---|---|---|
| Motion speed | | 40 |
| Size of motion | | 60 |
| Speaking speed | | 40 |
| Voice volume | | 60 |
| Voice quality | | 30 |
| ...... | ...... | ... |

(a) Personality database

| No | Personality | Condition |
|---|---|---|
| 11 | Impatient | Motion speed was increased by 20% |
| 12 | Broad-minded | Motion speed was decreased by 20% |
| 13 | Timid | Sound quality was increased by 20% |
| 14 | Dull fellow | Speaking speed was decreased by |
| ... | ...... | ............. |

(b) Personality motion database

| Personality No | Personality motion |
|---|---|
| 11 | Data11 |
| 12 | Data12 |
| 13 | Data13 |
| 14 | Data14 |
| ... | ...... |

Fig.3

(a) Title database

| No | Title | Condition |
|---|---|---|
| 123 | Amateur fighter | Level of fighter has become equal to 10 |
| 124 | Herb intoxication | Fighter has eaten 30 herbs |
| 125 | Rescuer | Fighter has cleared 10 quests |
| 126 | Veteran | Fighter has wined 100 times |
| ... | · · · · · | · · · · · · · · · · · · |

(b) Motion information Database

| Title No | Motion information |
|---|---|
| 123 | Parameter123 |
| 124 | Parameter124 |
| 125 | Parameter125 |
| 126 | Parameter126 |
| ... | · · · · · · |

(c) Motion information Database

| Title No | Motion data |
|---|---|
| 123 | Data123 |
| 124 | Data124 |
| 125 | Data125 |
| 126 | Data126 |
| ... | · · · · · · |

(d) Motion parameter

| Parameter123 | | |
|---|---|---|
| Motion speed | | 40 |
| Size of motion | | 60 |
| Speaking speed | | 40 |
| Voice volume | | 60 |
| Voice quality | | 30 |
| · · · · · | · · · · · · | ... |

Fig.4

(a) Personality database

| No | Personality | Condition |
|---|---|---|
| 11 | Impatient | Motion speed was increased by 20% |
| 12 | Broad-minded | Motion speed was decreased by 20% |
| 13 | Timid | Sound quality was increased by 20% |
| 14 | Dull fellow | Speaking speed was decreased by |
| ... | · · · · · | · · · · · · · · · · · · |

(b) Personality motion database

| Personality No | Personality motion |
|---|---|
| 11 | Data11 |
| 12 | Data12 |
| 13 | Data13 |
| 14 | Data14 |
| ... | · · · · · · |

GAME APPARATUS, GAME PROGRAM AND INFORMATION RECORDING MEDIUM

TECHNICAL FIELD

The present invention relates to a game apparatus capable of executing a game adapted for displaying, on a display part, characters active within a game space, a game program, and an information recording medium.

BACKGROUND ART

Hitherto, there is known a game apparatus in which various motion data stored in the database are reproduced to thereby allow each character existing within a virtual game space to perform a predetermined action (e.g., Patent reference 1).

Moreover, it is conventionally known that parameters relating to, e.g., motion speed and/or size of motion of characters manipulated by a player of a game are caused to be adjustable with respect to those characters (e.g., Patent reference 2). In such a conventional game apparatus, the mode of action, e.g., motion speed, size of motion, sound quality and/or sound volume of characters within a game is varied in accordance with parameters which have been set. Namely, there are varied the motion speed of characters displayed on a display screen and/or sound quality/sound volume of characters outputted from a speaker. Accordingly, the player of the game can also arbitrarily set parameters of characters to be manipulated in conformity with, e.g. own personality and/or sound quality/sound volume thus to realize game characters resembling to the player himself.

PRIOR ART REFERENCES

Patent References

[Patent reference 1] Japanese Patent Application Laid Open No. 2009-72310
[Patent reference 2] Japanese Patent Application Laid Open No. 2005-253687

SUMMARY OF THE INVENTION

Problems to be Solved

However, in conventional game apparatuses, since motion data fixed with respect to respective characters are reproduced, motion patterns of those characters are fixed at all times. Accordingly, in such cases where player uses predetermined characters for a long time to proceed the game, as in, e.g., RPGs (Role-Playing-Games), there was the problem that player would become weary of motion patterns of characters used.

In view of the above, an object of the present invention is to improve real thrill for a game of a player. In concrete terms, an object of the present invention is to provide a game such that even when player uses predetermined characters for a long time to proceed a game as in the case of RPGs, there is no possibility that player might become weary of motion patterns of characters used.

Moreover, in such cases that player of a game sets parameters of the mode of actions of characters to be manipulated in conformity with the own personality as in the case of conventional game apparatuses, those parameters would dear to be set only on the basis of subjectivity of the player. As described above, in the conventional game apparatuses, there were instances where since parameters of actions of characters are set on the basis of subjectivity of the player, those parameters might not reflect the objective personality. Further, when parameters of the respective actions of characters are set by the subjectivity of the player, those characters perform respective actions within a predicted range of the player. For this reason, there is no possibility that character performs an action beyond the prediction by the player, leading to lacking in interest.

In view of the above, in the preferred embodiment of the present invention, an object is to provide a game adapted for objectively grasping the personality of a player thus to have ability to change parameters of the respective actions of characters to be manipulated on the basis of the objective personality of the player. Further, in the preferred embodiment of the present invention, an object is to provide a game in which parameters of characters to be manipulated are set so that any unexpected action of player is performed while reflecting personality of the player.

Means for Solving the Problems

The present invention is essentially based on the finding in which there is employed a scheme to store motion information of characters every title data obtained in the case where each specific condition of a game is attained to permit player to set arbitrary title data with respect to each character so that player can suitably change motion information of characters also in the progress of the game.

The first aspect of the present invention relates to a game apparatus capable of executing a game adapted for displaying, on a display part, characters active based on command information inputted to an input part.

The game apparatus according to the present invention includes a title database, a motion information database, a title data extracting part, a title storage part, an action mode determining part and a character display part.

The title database is adapted so that title data given to characters when a plurality of specific conditions which are set in the progress of the game are attained are stored in a manner associated with each other.

The motion information database is adapted so that motion information for determining the mode of actions of characters to which titles are respectively given with respect to a plurality of title data stored in the title database are stored in a manner associated with each other.

The title storage part is adapted so that when any character attains any one of the specific conditions in the progress of the game, it serves to read out any one of the titles stored in the title database in a manner associated with the specific condition thus attained.

The title storage part is adapted so that title data which are read out by the title data extracting part are stored therewithin.

The action mode determining part serves to determine the mode of action of a character on the basis of motion information stored in the motion information database in a manner associated with an arbitrary one of the titles, which has been selected and inputted by an input part from the titles stored in the title storage part.

The character display part serves to display, on the display part, the characters of the mode of actions determined by the action mode determining part.

By employing such a configuration, the present invention can increase motion patterns of characters depending upon attainable titles in accordance with the progress of the game. Moreover, player selects an arbitrary title to thereby have ability to change motion pattern of the character as occasion demands. Accordingly, in accordance with the present invention, there can be provided a game in which even in such cases where player proceeds the game by using predetermined characters as in RPGs, there is no possibility that player might not become weary of motion patterns of characters used.

Here, in the present invention, motion information may motion data indicating the content of the action of each character; the action mode determining part may serve to determine action mode of each character on the basis of motion data stored in the motion information database in a manner associated with an arbitrary title which has been selected and inputted by the input part from titles stored in the title storage part; and the character display part may serve to reproduce motion data to thereby display, on the display part, characters of the action mode determined by the action mode determining part.

In the preferred embodiment of the present invention, motion information may motion parameters for determining the mode of various actions of characters displayed on the display part.

Moreover, in the preferred embodiment of the present invention, there is further included a detection information extracting part for extracting detection information when input of command information with respect to the game apparatus is detected by a sensor key provided at the input part.

Here, detection information extracted by the detection information extracting part may at least includes a pressing force with respect to the sensor key when input of command information is detected by the sensor key, a time interval in which input of the command information is detected by the sensor key, and the number of times in which the sensor key detects input of the command information within a predetermined time.

In this case, the action mode determining part serves to change, on the basis of detection information extracted by the detection information extracting part, each motion parameter stored in the motion information database in a manner associated with an arbitrary title which has been selected and inputted by the input part from titles stored in the title storage part to determine changed parameters of various actions of the characters to thereby determine the action mode of the characters.

By employing such a configuration, the present invention is adapted so that, e.g., in such a case where the sensor key is repeatedly depressed under unconsciousness state of player, it is possible to change motion parameters of characters manipulated by user on the basis of detection information that the sensor key has been repeatedly depressed. In short, the present invention aims at changing motion parameters of characters on the basis of objective information of personal habit of key operation by user. Accordingly, in accordance with the preferred embodiment of the present invention, there can be provided a game capable of objectively grasping personality of each character to change parameter of the action of each character to be manipulated on the basis of the objective personality of the player thus grasped. Further, in accordance with the preferred embodiment of the present invention, it is possible to change parameters of characters under unconsciousness state of player. For this reason, there can be provided a game in which parameters of characters to be manipulated are set so that actions beyond prediction by players are performed while reflecting the personality of the player.

In the preferred embodiment of the present invention, there are further included a personality database, a personality motion database, a character personality determining part and a personality motion reproducing part.

The personality database is adapted so that information of the personality of each game character is stored in a manner associated with the degree of change in which each motion parameters stored in the motion information database in a manner associated with an arbitrary title which has been selected and inputted by the input part from the titles stored in the title storing part has been changed by the action mode determining part.

The personality motion database is adapted so that motion data indicating the contents of actions of characters are stored with respect to respective information of personalities of game characters stored in the personality database.

The motion mode determining part serves to change each motion parameter stored in the motion information database in a manner associated with an arbitrary one of the titles, which has been selected and inputted by the input part from the titles stored in the title storage part, and the character personality determining part serves to determine personality of each character, by making reference to the personality database, on the basis of information indicating the degree of change which has been changed by the action mode determining part.

The personality motion reproducing part serves to read out, from the personality motion database, motion data stored in a manner associated with the personality of each character determined by the character personality determining part to reproduce the motion data thus read out on the display part.

By employing such a configuration, in the preferred embodiments of the present invention, since motion data of characters corresponding to personality of player can be reproduced, player will have attachment to the characters. Moreover, since the personality of player (the personality of each character) is determined under unconsciousness state of player in accordance with detection information detected by the key sensor, motion data which are not expected by player among motion data based on the personality of each character would be reproduced.

Effects/Advantages of the Invention

The present invention can control motions of game characters by a novel method thus to permit a player to improve real thrill with respect to the game.

BRIEF DESCRIPTION OF THE DRAWINGS

FIG. 3(a) is a conceptual diagram showing an example of information stored in title database. FIG. 3(b) and FIG. 3(c) are conceptual diagrams showing examples of information stored in motion information database. FIG. 3(d) is a conceptual diagram showing an example of motion parameters.

FIG. 4(a) is a conceptual diagram showing an example of information stored in personality database. FIG. 4(b) is a conceptual diagram showing an example of information stored in personality motion database.

BEST MODE FOR CARRYING OUT THE INVENTION

Preferred embodiments according to the present invention will now be described. It should be noted that the present invention is not limited to embodiments described below. Namely, the present invention includes a scope within which modifications/changes are made as occasion demands within the scope within which the person skilled in the art is self-explanatory from embodiments described below.

Figure 1:
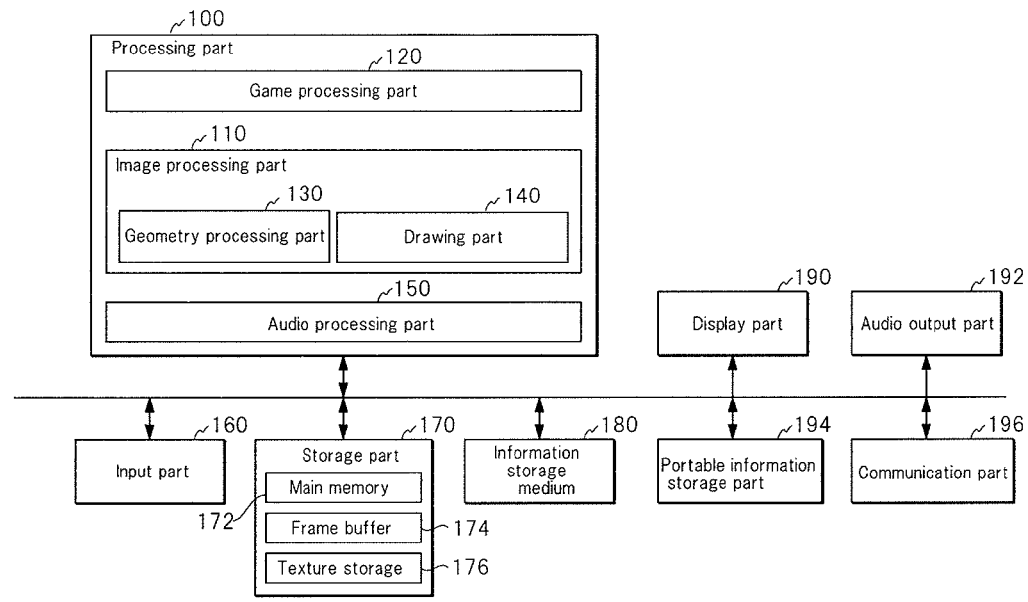
FIG. 1 is a block diagram showing an example of a hardware configuration of a game apparatus according to the present invention.

FIG. 1 is a block diagram of a game apparatus according to an embodiment of the present invention. The present invention can be suitably utilized as portable game apparatuses, game apparatuses for home use and/or game apparatuses for business purpose. The game apparatus to which the present invention is applied will now be described. In this example, the game apparatus illustrated in FIG. 1 may at least include a processing part 100, and a storage part 170. Alternatively, the game apparatus may also include the processing apparatus 100, the storage part 170 and an information storage medium 180. Blocks except for the above, e.g., an input part 160, a display part 190, an audio output part 192, a portable information storage part 194 and a communication part 196 may be allowed to have arbitrary components.

As shown in FIG. 1, the processing part 100, the input part 160, the storage part 170, the information storage medium 180, the display part 190, a portable information storage part 294, an audio output part 292, and a communication part 296 are connected by bus, etc., wherein transmission/reception of information can be performed. When a predetermined information is inputted from the input/output part 160, the processing part 100 serves to read out control program stored in a main memory of the storage part 170. Moreover, the processing part 100 serves to read out data stored in the storage part 170, the information storage medium 180 and/or the portable information storage part 194 as occasion demands in accordance with command of the control program to perform a predetermined operation at a game processing part 120. Further, the processing part 100 serves to temporarily store the computational result into the storage part 170 to output information from the display part 190, the sound output part 192 and/or the communication part 196.

The processing part 100 serves to perform various processing such as control of the entirety of the system, instruction to respective blocks within the system, game processing, image processing and/or audio processing, etc. The functions of the processing part 100 may be realized by hardware such as various processors (CPU, DSP, etc.), and/or ASIC (gate array, etc.), etc., and predetermined programs (game programs).

The input part 160 serves to allow a player to input operating data. The function of the input part 160 can be realized by a controller comprising, e.g., lever, button, touch panel and/or hardware. It is to be noted that, particularly in the case of the portable game apparatus, the input part 160 may be formed integrally with a game apparatus body. The input part 160 includes a key sensor for detecting key input, wherein the key sensor can detect input operation by player. For example, the key sensor can detect a pressing force when a player performs input operation to convert it into data. Processing information from the input part 160 is transmitted to a main processor, etc., through serial interface (I/F) and/or bus.

The storage part 170 functions as work areas of the processing part 100 and the communication part 196, etc. Moreover, the storage part 170 may be adapted so that programs and/or various Tables, etc. are stored therewithin. The storage part 170 may include, e.g. a main memory 172, a frame buffer 174, and a texture storage part 176, and may store therewithin various Tables, etc. in addition thereto. The function of the storage part 170 may be realized by hardware such as ROM and/or RAM, etc. As the RAM, there are enumerated VRAM, DRAM and/or SRAM, etc., and these RAMs may be selected as occasion demands depending upon use purpose. The VRAM, etc. constituting the frame buffer 274 is used as each work area of various processors.

Figure 2:
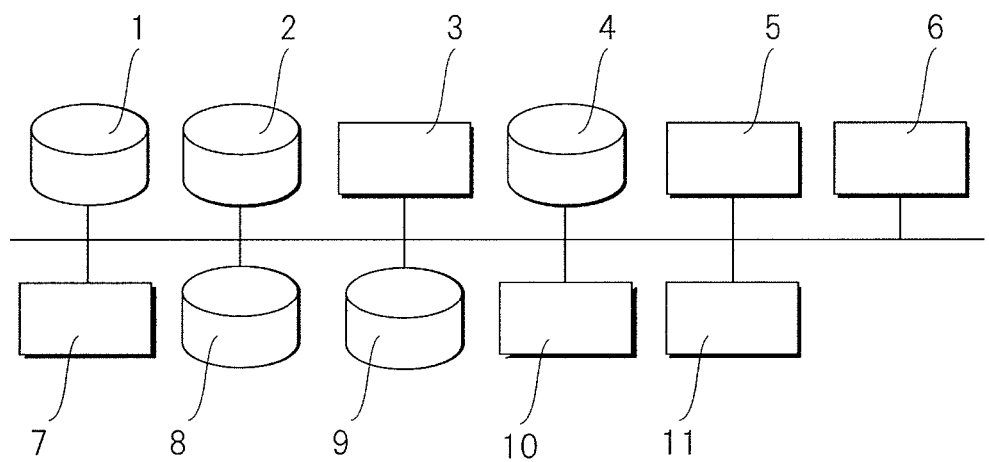
FIG. 2 is a functional block diagram of the game apparatus according to the present invention.

The information recording medium (computer usable storage medium) 180 is adapted to store therewithin programs and/or data, etc. The information recording medium 180 may be on the market as a cassette, etc. Moreover, the function of the information storage medium 180 may be realized by hardware such as optical discs (CD, DVD), magneto-optical discs (MO), magnetic discs, hard discs, magnetic tapes and/or memories (ROMs), etc. The processing part 100 serves to perform various processing on the basis of information stored in the information storage medium 180. The information storage medium 180 is adapted to store therewithin information (programs and/or data) for executing the functional blocks (FIG. 2) of the embodiment according to the present invention which will be described later.

The display part 190 serves to output images generated by this embodiment. Its function may be realized by hardware such as CRT (Braun tube), LCD (Liquid Crystal Display devices), OEL (Organic Electroluminescence Light receiving devices), PDP (Plasma Display Panels), and/or HMD (Head Mounted Display devices), etc. The display part 190 is adapted so that motion images drawn and generated by the image processing part 110 are displayed thereon.

The audio output part 192 serves to output sound. The function of the audio output part 192 may be realized by the hardware such as speaker, etc. The audio output is subjected to audio processing, e.g., by the audio processing part 150 like sound processor connected to a main processor, etc. through the bus, and is outputted from the audio output part 102 such as speaker, etc.

The portable information storage part 194 is adapted so that personal data and/or save data, etc. of player are stored therewithin. As this portable information storage part 194, there are enumerated memory card and/or portable game device, etc. The function of the portable information storage part 194 can be attained by well known storage means such as memory card, flash memory, hard disk and/or USB memory, etc.

The communication part 196 is an arbitrary component for performing various kinds of controls to perform communication from and to the external (e.g., game server, other game apparatus and/or other image generating system). The function of the communication part 196 may be realized by the hardware such as various processors and/or communication ASIC, etc., and programs, etc.

It is to be noted that programs or data for executing the game apparatus may be distributed from information storage medium that the game server has to the storage part 270 and/or the information storage medium 180 through network and the communication part 196.

As the processing part 100, there may be mentioned a processing part including game processing part 120, image processing part 110 and audio processing part 150. In concrete terms, there are enumerated main processor, co-processor, geometry processor, drawing processor, processor for data processing, arithmetic circuit, and/or general purpose arithmetic circuit, etc. These components are connected by bus, etc. as occasion demands so that transmission/reception of signals can be performed. Moreover, the processing part 100 may further comprise a data expansion processor for performing expansion of compressed information.

In this example, the game processing part 120 serves to perform various game processing e.g., progressive processing of the game, setting process of selection screen, arithmetic processing for determining position or rotational angle (rotational angle around the X-axis, Y-axis or Z-axis) of object, processing for allowing object to be active (motion processing), processing for determining position of visual point (position of virtual camera) and/or line of sight angle (rotational angle of virtual camera), processing for performing arithmetic operation of game result (result, record), and/or game over processing etc. on the basis of operating data from the input part 160, personal data, storage data, and/or game programs, etc. from the portable information storage part 194.

The image processing part 130 serves to perform various image processing in accordance with instructions from the game processing part 120, etc. Moreover, the audio processing part 150 serves to perform various audio processing in accordance with instructions from the game processing part 120, etc.

The functions of the game processing part 120, the image processing part 110 and the audio processing part 150 may be all realized by hardware or may be all realized by programs. Alternatively, those functions may be realized by both hardware and program. As the image processing part 110, there may be mentioned, e.g., an image processing part including a geometry processing part 130 (three-dimensional coordinate arithmetic part), and a drawing part 140 (rendering part).

In the present embodiment, e.g., work areas of the processing part 100, the game processing part 120 and the storage part 270 of the game apparatus and game programs stored in the information storage medium 180 function as functional blocks illustrated in FIG. 3. As illustrated in FIG. 3, the game apparatus according to the present invention includes a title database 1, a motion information database 2, a title data extracting part 3, a title storage part 4, an action mode determining part 5, a character display part 6, a detection information extracting part 7, a personality database 8, a personality motion database 9, a character personality determining part 10 and a personality motion reproducing part 11. In addition, these respective components are connected through bus so that transmission/reception of information can be performed.

The title database 1 is adapted so that data of titles given to characters when a plurality of specific conditions which are set in the progress of the game are respectively attained are stored therewithin in a manner associated with each other. FIG. 3(*a*) is a conceptual diagram for explaining information stored in the title database 1. As illustrated in FIG. 3(*a*), e.g., title of "amateur fighter" is stored in the title database 1 in a manner associated with the condition where "the level of the fighter has become equal to 10".

This "condition" is set, e.g., on the basis of parameters of the levels of characters which are set every characters and/or parameters of the number of fighting times counted and stored every characters. Moreover, e.g., the fact that a specific task in the progress of the game has been attained as in the case where a specific item has been obtained may be the above-described "condition". The "condition" referred to here may be set as occasion demands in accordance with the kind of the game, e.g., RPG, fighting game, simulation game and/or puzzle game, and/or the content thereof. Moreover, "title" stored in the title database in a manner associated with a specific condition indicates the personality of each game character, and corresponds to the attained condition. Similarly to the above-described "condition", "title" may be also set as occasion demands in accordance with the kind of the game and the content thereof. In addition, title numbers are attached to titles and the conditions thereof in the title database 1 shown in FIG. 3(*a*).

The motion information database 2 is adapted so that motion information for determining action mode of characters to which titles are given are stored with respect to respective data of titles stored in the title database 1 in a manner associated with each other. In the action mode of characters, there are included, e.g., motion patterns relating to actions of characters, motion speed when each character becomes active within a virtual space in accordance with input operation by player and size of the motion thereof, reading speed of speech and/or high/low sound quality which are outputted in correspondence with each character. Moreover, as motion information for determining the action mode of characters, there are included, e.g., parameters as numeric value for determining the mode of respective various actions of characters, and motion data as motion images relating to motion patterns in regard to actions of characters.

FIG. 3(*b*) and FIG. 3(*c*) are conceptual diagrams for explaining information stored in the motion information database 2. In the motion information database 2, there are stored, in a manner associated with title data, motion parameters for determining the mode of various actions of characters, and motion data relating to motion patterns of characters. In the motion data, there are included motion image data of actions of characters, motion image data of expressions of characters and motion image data relating to characters in addition thereto. Further, as shown in FIG. 3(*b*) and FIG. 3(*c*), there may be stored link information to a storage part in which motion information are stored in the motion information database 2 in a manner associated with title data (title numbers). For example, in FIG. 3(*b*), information relating to motion parameters of characters are stored in a manner associated with data of titles (title numbers). In addition, for example, in FIG. 3(*c*), information relating to motion data of characters are stored in a manner associated with data of titles (title numbers).

A more practical example of motion parameters will now be described with reference to FIG. 3(*d*). The motion parameters are numeric values for determining the mode of various actions of characters displayed on the display part. The example of the mode of various actions of characters is motion speed, size of motion, generating speed, sound volume generated and sound quality shown in FIG. 3(*d*). It should be noted that the mode of various actions of characters are not limited to the mode of actions described above, but there may be included any action mode which can be represented by using numeric value as the action mode relating to characters. In the example of FIG. 3, there is shown motion parameter (number 123) of title "amateur fighter" (title No. 123). In the parameter 123, an initial setting is made as those motion parameters of the title number 123 such that the value of the motion speed is 40, the value of the size of motion is 60, the value of generating speed is 40, the value of sound volume generated is 60, and the value of sound quality is 30. With respect to such motion parameters, initial values different every titles are set. The mode of various actions of characters is dependent upon motion parameters. For example, according as the value of the action speed is higher, a speed when character becomes active in the game becomes higher; and according as the sound quality is higher, voice that character speaks in the game becomes larger.

Moreover, in the respective motion parameters, there may be provided an adjustable region from the maximum value to the minimum value where parameters are changed. Namely, motion parameters stored in the motion information database are changed on the basis of detection information which will be described later. Since initial set values of motion parameters are generally set in accordance with features of titles, if respective parameters are infinitely changed, features of titles would not be reflected as numeric values. In view of the above, the adjustable region is set so that features of respective titles are maintained to a certain degree. For example, setting may be made such that 10%, 20% or 30% of the initial set value of each parameter can be increased or decreased. Moreover, the adjustable region of parameters may be varied every parameters. In FIG. 3(d), the adjustable regions with respect to respective parameters are shown by frame body of thick characters.

The title data extracting part 3 becomes operative so that when a character has attained a certain specific condition in the progress of the game, it serves to read out data of a title stored in the title database 2 in a manner associated with the specific condition. Namely, the title data extracting part 3 serves to determine, by making reference to the title database 2, as to whether or not a character manipulated by a player has attained either one of a plurality of specific conditions. Moreover, the title data extracting part 3 becomes operative so that when it is determined that the character has attained the specific condition, it serves to extract title data stored in the title database 2 to store the title data thus extracted into the title storage part 4. The title data extracting part 3 sequentially performs the above-described processing when it is determined that the character has attained the specific condition. The title storage part 4 is adapted so that data of titles which have been read out by the title data extracting part 3 are accumulated and stored therewithin. In general, since title data stored in the title storage part 4 is handled as personal data or save data of player, the portable information storage part functions as the title storage part 4. Moreover, information relating to titles stored in the title storage part 4 is displayed on a display part connected to the game apparatus or a display part integral with the game apparatus so that game player can confirm it as occasion demand. Further, the game player serves to select an arbitrary one of title data stored in the title storage part 4 by the input part of the game apparatus to set it as title of a character to be manipulated. Thus, when title data stored in the title database 2 is read out by the title data extracting part 3, player of the game serves to select only a title corresponding to the title data thus read out among title data stored in the title storage part 4 thus to have ability to set it as the title of the character.

The action mode determining part 5 serves to determine the action mode of characters on the basis of motion information stored in the motion information database 2 in a manner associated with an arbitrary title which has been selected and inputted by the input part from titles stored in the title storage part 4. Namely, in the case of the form where motion parameters which are numeric values are stored in the motion information database 2, the action mode determining part 5 serves to determine the action mode, e.g., the motion speed or sound quality of each character on the basis of the motion parameters. In this case, the game processing part functions as the action mode determining part 5, and the game processing part performs an arithmetic operation for determining the action mode of characters in accordance with values of motion parameters.

On the other hand, in the case of the form where motion data serving as motion image are stored in the motion information database 2, the action mode determining part 5 serves to specify its motion image data. In this example, such motion image data are data reproduced by the game processing part in a predetermined situation (e.g., at the time of encountering with enemy character, at the time of attacking enemy character, at the time when character is damaged, and at the times of other actions) of the game.

The character display part 6 serves to display, on the display part, characters of the action mode determined by the action mode determining part 5. Accordingly, in the case where the action mode of each character is determined by the action mode determining part 5 on the basis of motion parameters stored in the motion information database 2, the character display part 6 serves to display characters which perform actions in accordance with motion parameters. For example, in the case where move operation of a character in which title having value of an action speed of 40 is set is performed by the input part, the character display part 6 serves to display, on the display part, the character moving at the motion speed of the value 40. On the other hand, in the case where motion data stored in the motion information database 2 is specified so that the action mode determining part 5 serves to determine the action mode of character, the display part 6 serves to reproduce motion data corresponding to action of the character.

By employing the above-described configuration, in this embodiment, it is possible to increase motion patterns of characters in accordance with titles which can be gained in accordance with the progress of the game. Moreover, player serves to select an arbitrary title, thereby making it possible to change motion patterns of each character as occasion demands. Accordingly, even in such a case where player uses predetermined characters for a long time to proceed the game as in the RPG the possibility that player may become weary of motion pattern of characters used is eliminated.

A preferred embodiment of the present invention will now be described. In the preferred embodiment, motion information are motion parameters for determining the mode of various actions of characters. In this embodiment, there is employed a scheme to change motion parameters which are set every titles. In this embodiment, the game apparatus further includes, in addition to the above-described components, a detection information extracting part 7, a personality database 8, a personality motion database 9, a character personality determining part 10 and a personality motion reproducing part 11.

The detection information extracting part 7 serves to extract detection information when input of command to the game apparatus is detected by the sensor key provided at the input part. As previously described, the input part is used for allowing player to input operating data of characters. There is conceivable, e.g., a controller comprising lever, button, touch panel and hardware as kind of the input part. Further, the input part includes a key sensor for detecting input of operating data, whereby when the key sensor detects input of the operating data, processing information from the input part is transmitted to, e.g., the game processing part. In addition, the key sensor can detect a pressing force when player performs input operation to convert it into data.

Further, as detection information when input of command information to the game apparatus is detected by the sensor key, there are included, e.g., a pressing force with respect to the sensor key when input of command information is detected by the sensor key, a time interval during which input of command information is detected by the sensor key, and the number of times when the sensor key detects input of the command information within a predetermined time. Moreover, a time period during which the sensor key continuously detects input of the command information is also included in the detection information. Moreover, in the case where the input part comprises a plurality of sensor keys, there are also included the number of sensor keys simultaneously depressed when input of the command information is detected by the sensor key. As described above, detection information extracted by the detection information extracting part 7 is used as information for determining the personality of player from personal habit when the player of the game operates the input part or timing when the player thereof inputs command information. Accordingly, the detection information is not limited to the above-described practical examples, but there may be employed detection information suitable for kind of the input part, and the kind of the game and the content thereof.

In the preferred embodiment of the present invention, the action mode determining part 5 serves to change, on the basis of detection information extracted by the detection information extracting part 7, each motion parameter stored in the motion information database 2 in a manner associated with an arbitrary title selected from titles stored in the title storage part 4. Further, the action mode determining part 5 serves to determine changed parameters of various actions of characters to handle them as motion parameters for determining the action mode of characters.

In concrete terms, there exist different kinds of parameters of which values are changed depending upon detection information extracted by the detection information extracting part 7, and/or different kinds of the degrees of changes where those parameters are changed. For example, change condition database may be constructed. The action mode determining part 5 serves to determine, by making reference to the change condition database, as to whether or not detection information extracted by the detection information extracting part 7 satisfies the condition for parameter change. Further, in the case where it is determined that the detection information satisfies the condition for parameter change, the action mode determining part 5 serves to perform arithmetic processing for determining changed parameters on the basis of the kind of parameters to be changed in accordance with detection information stored in a manner associated with the condition and the degree of change thereof to store the computational result into the main memory.

In concrete terms, there is stored in the change condition database the fact that in the case where the sensor key is pressed by a predetermined pressing force or more, e.g., parameter of sound volume generated is increased by 10% of a current value is stored. Moreover, there is stored in the change condition database the fact that e.g., in the case where the sensor key is continuously depressed at a time interval of 1 sec. or less, parameter of the operating speed is increased by 10% of a current value. Further, there is stored in the change condition database the fact that e.g., in the case where the sensor key is depressed 15 times or more within 10 sec., parameter of the sound quality is increased by 10% of a current value.

Moreover, in the change condition database, there may be stored, the condition for parameter change, the kind of parameters to be changed, the degree of change of parameters; and situation of the game executed when input of command information is detected by the sensor key, and the kind of command information detected by the sensor key in addition thereto in a manner associated with each other. As an example of the situation in RPG, there are conceivable fighting phase against enemy character, move phase of characters in the field, phase where movie video is reproduced, and conversational phase with other characters. Further, as the kind of command information detected by the sensor key in RPG, there are conceivable, e.g., command information for performing attacking with respect to enemy character, command information for deserting from enemy character and/or command information for performing conversation with other characters. The situation of the game and the kind of the command information may be set as occasion demands in accordance with the kind of the game and the content thereof. For example, in the change condition database, there are stored the fact that "the sensor key is continuously depressed at a time interval of 1 sec. or less" in "fighting phase with respect to the enemy character", and in the case where "command information for deserting from enemy character" is inputted, "parameter of the motion speed" is caused "to increase by 20% of a current value".

The action mode determining part 5 performs such an arithmetic processing to thereby change initial values of motion parameters which are set with respect to respective titles. It is to be noted that, as previously described, there may be provided an adjustable region from the maximum value to the minimum value where parameters are changed for respective motion parameters.

Moreover, the game apparatus in this embodiment includes personality database 8. The personality database 8 is adapted so that there are stored information of personalities of game characters in a manner associated with the degree of changes where each motion parameter stored in the motion information database 2 in a manner associated with an arbitrary title, which has been selected from the titles stored in the title storage part 4, has been changed by the action mode determining part 5. FIG. 4(a) is a conceptual diagram showing information stored in the personality database 8. As shown in FIG. 4(a), information indicating personalities of characters are stored in the personality database 8 in a manner associated with the degree of changes which has been changed from initial value of each motion parameter stored in the motion information database 2.

In concrete terms, in the example shown in FIG. 4(a), in the case where parameter of conversational speed which is set for each title is increased by 20% or more from the initial value thereof, it is stored that the personality of the character is "impatient". In this example, values of motion parameters are updated and stored every time values are changed by the action mode determining part 5. Accordingly, in the case where parameters are changed next, respective values updated last are read out to perform arithmetic processing for change of parameters on the basis of values which have been read out. Thus, the personalities of characters are determined on the basis of the accumulated and changed parameters.

The personality motion database 9 is adapted so that motion data indicating the action contents of characters are stored therewithin with respect to respective information of personalities of game characters stored in the personality database 8. It is to be noted that link information to the storage part where motion data are stored may be stored in the personality motion database 9 in a manner associated with information (personality numbers) of personality of each character. FIG. 4(b) is a conceptual diagram showing information stored in the personality motion database 9. In the personality motion data, there are included motion image data of actions of characters, motion image data of expression of characters, and motion image data relating to other characters.

The action mode determining part 5 serves to change each motion parameter stored in the motion information database 2 in a manner associated with an arbitrary title selected from titles stored in the title storage part 4, and the character personality determining part 10 thus serves to determine each personality of characters by making reference to the personality database 8 on the basis of information of the degree of change which has been changed by the action mode determining part 5. Accordingly, the character personality determining part 10 is operative so that when it is determined that each motion parameter of characters where each title is set is changed so that the condition stored in the personality database 8 is satisfied, it serves to determine the personality of the character as a personality stored in a manner associated with the condition thus determined.

Further, the personality motion reproducing part 11 serves to read out, from the personality motion database 9, motion data stored in a manner associated with the personality of each character determined by the character personality determining part 10 to reproduce it on the display part. In the personality motion database 9, there are stored motion data indicating the content of the actions of characters with respect to respective personalities stored in the personality database 8. The personality motion reproducing part 11 serves to read out this motion data to reproduce it on a display, e.g., monitor, etc.

Figure 5:
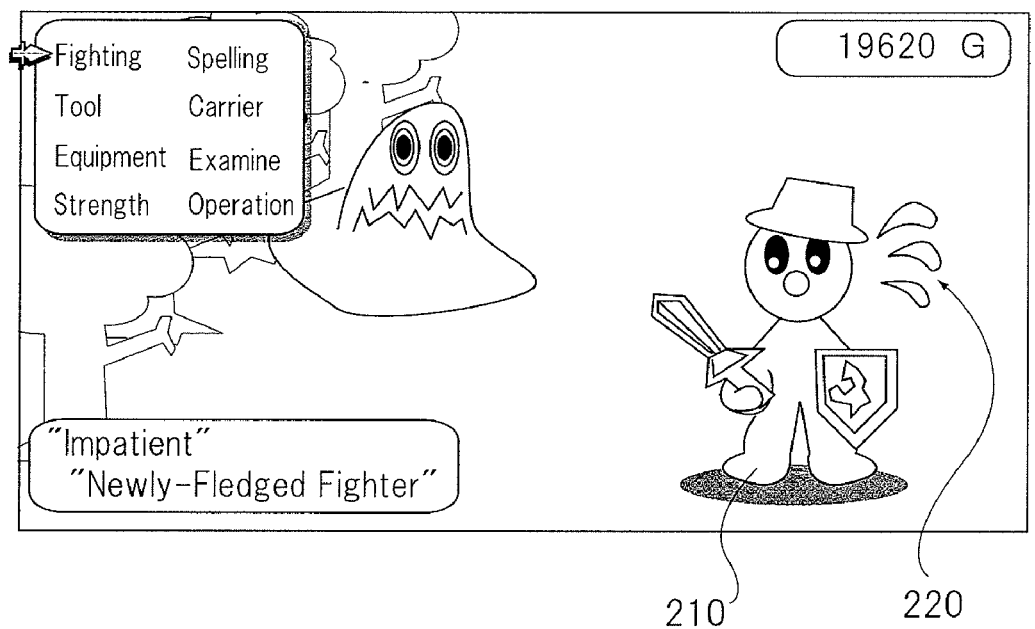
FIG. 5 is a diagram showing an example of a game image displayed on a display part of the game apparatus according to the present invention.

FIG. 5 is a diagram showing an example of game image displayed on the display part of the game apparatus according to the present invention. FIG. 5 shows an example where motion data corresponding to personalities of characters are reproduced on the personality motion reproducing part 11. For example, character 210 shown in FIG. 5 satisfied the condition stored in the title database 1 to acquire the title "amateur fighter". Further, the title of "amateur fighter" is set by player. On the other hand, when "the sensor key is repeatedly depressed at a time period of 1 sec. or less" in "fighting phase against enemy character", "command information for deserting from enemy character", which are stored in the change condition database as an operation input by player, the condition for changing each motion parameter, which indicates "parameter of motion speed" "by 20% of a current value" is satisfied so that the parameter of the motion speed was increased by 20% from the initial value. Accordingly, the condition for determining the personality as "impatient" which is stored in the personality database 8 is satisfied, and it is recognized that the character 201 is thus "impatient". In view of above, the personality motion reproducing part 11 serves to read out, by making reference to the personality motion database 10, motion data which is stored in a manner associated with the personality "impatient" to reproduce the motion data thus read out. The motion data stored in a manner associated with the personality "impatient" is, e.g., motion image data 220 in which sweats stand as shown in FIG. 5. It is to be noted that there may be employed a scheme to respectively join titles and personalities of characters which are determined by the game apparatus to display them on the display part. In FIG. 5, "impatient" (personality) is displayed as amateur fighter (title) at the left and lower portion of the display screen.

[The Fundamental Operation of the Game Apparatus]

When a power supply of the system is turned ON, a part or the entirety of information stored in the information storage medium 180 is transferred to e.g., the storage part 170. Further, programs for game processing are stored into, e.g., the main memory 172 and various data are stored in the texture storage part 176 and/or Table (not shown), etc.

Operating information from the input part 162 is transmitted to the processing part 100 through, e.g., serial interface and/or bus which are not shown, at which audio processing and/or various image processing are performed. Audio information which has been subjected to processing by the audio processing part 150 is transmitted to the audio output part 192 through the bus and is outputted as sound. Moreover, save information, etc. stored in the portable information storage part 194 such as memory card, etc. is also transmitted to the processing part 100 through the serial interface and/or the bus which are not shown so that predetermined data are read out from the storage part 170.

The image processing part 130 serves to perform various kinds of image processing in accordance with instructions, etc. from the game processing part 120. In concrete terms, the geometry processing part 130 serves to perform geometry operation (three-dimensional coordinate operation) such as coordinate transformation, clipping, perspective transformation and/or light source calculation, etc. Further, object data (vertex coordinates, vertex texture coordinates, and/or luminance data, etc.) after being subjected to geometry processing (after being subjected to perspective transformation) are stored into, e.g., the main memory 172 of the storage part 170. Next, the drawing part 140 serves to draw object into the frame buffer 174 on the basis of object data after being subjected to geometry operation (after being subjected to perspective transformation), and texture, etc. stored in the texture storage part 176, etc.

Information stored in the frame buffer 174 is transmitted to the display part 190 through the bus, and is drawn thereon. In this way, the game apparatus of the present invention functions as a game apparatus having computer graphics.

Industrial Applicability

The present invention can be suitably utilized in the game industry.

Description of Reference Numerals

1 Title database
2 Motion information database
3 Title data extracting part
4 Title storage part
5 Action mode determining part
6 Character display part
7 Detection information extracting part
8 Personality database
9 Personality motion database
10 Character personality determining part
11 Personality motion reproducing part
100 Processing part
110 Image processing part
120 Game processing part
130 Geometry processing part
140 Drawing part
150 Audio processing part
160 Input part
170 Storage part
172 Main memory
174 Frame buffer
176 Texture storage part
180 Information storage medium
190 Display part
192 Audio output part
194 Portable information storage part
196 Communication part
210 Character
220 Motion data

The invention claimed is:

1. A game apparatus which can control a character in a game based on input command input by an input device and can display the game on a display, the game apparatus comprising:

a title database that stores titles, each of the titles being given to the character when the character attains predetermined condition, in a manner that each of the titles relates to the predetermined condition, a motion information database that stores motion information that controls actions of the character based on title that is given to the character, in a manner that each of the motions relates to corresponding title, the title being one of the titles stored in the title database;

a title data extracting part that extracts title from the title database when the character attains the predetermined condition using the predetermined condition attained by the character;

a title storage part that stores title or titles which have been read out by the title data extracting part;

an action mode determining part that determines action of the character based on the motion information, which is stored in the motion information database and is extracted based on the title selected from the title or titles stored in the title storage part based on the input command; and a character display part that displays a character on the display, action of the character being controlled by the action mode determining part; wherein the motion information is motion parameters for determining various actions of the character displayed on the display, and wherein the input device comprises a sensor key, the game apparatus further comprises a detection information extracting part that extracts detected information that is detected by the sensor key, wherein the action mode determining part determines actions of the character by changing the motion parameters based on the detected information extracted by the detection information extracting part and determining the parameters of actions of the character after the motion parameters are changed.

2. A game apparatus according to claim 1, wherein the detection information extracted by the detection information extracting part comprises a pressing force with respect to the sensor key when input of the input command is detected by the sensor key, a time interval during which input commands are detected by the sensor key, and number of times that the sensor key detects input commands within a predetermined time.

3. A game apparatus according to claim 1, wherein the motion information is motion data that indicates how the character acts, wherein the action mode determining part determines actions of the character based on the motion data, and wherein the character display part displays actions of the character determined by the action mode determining part by reproducing the motion data.

4. A program that makes a computer act as a game apparatus which can control a character in a game based on input command input by an input device and can display the game on a display, the game apparatus comprising:

a title database that stores titles, each of the titles being given to the character when the character attains predetermined condition, in a manner that each of the titles relates to the predetermined condition, a motion information database that stores motion information that control actions of the character based on title that is given to the character, in a manner that each of the motions relates to corresponding title, the title being one of the titles stored in the title database;

a title data extracting part that extracts title from the title database when the character attains the predetermined condition, the title being stored relating to the predetermined condition attained by the character;

a title storage part that stores title or titles which have been read out by the title data extracting part;

an action mode determining part that determines action of the character based on the motion information, which is stored in the motion information database and is extracted based on the title selected from the title or titles stored in the title storage part based on the input command; and a character display part that displays a character on the display, action of the character being controlled by the action mode determining part wherein the motion information is motion parameters for determining various actions of the character displayed on the display, and wherein the input device comprises a sensor key, the game apparatus further comprises a detection information extracting part that extracts detected information that is detected by the sensor key, wherein the action mode determining part determines actions of the character by changing the motion parameters based on the detected information extracted by the detection information extracting part and determining the parameters of actions of the character after the motion parameters are changed.

5. A computer readable information storage medium in which the program according to claim 4 is stored.

* * * * *